United States Patent
Yang (10) Patent No.: US 6,783,115 B1
(45) Date of Patent: Aug. 31, 2004

(54) INTEGRALLY FORMED NOZZLE STRUCTURE WITH SOFT AND HARD PLASTICS

(76) Inventor: Shih-Sheng Yang, P.O. Box 82-144, Taipei (TW)

( * ) Notice: Subject to any disclaimer, the term of this patent is extended or adjusted under 35 U.S.C. 154(b) by 0 days.

(21) Appl. No.: 10/368,051

(22) Filed: Feb. 19, 2003

(51) Int. Cl.[7] ............................................. F16K 31/00
(52) U.S. Cl. ...................................... 251/342; 251/358
(58) Field of Search ........................ 222/175; 251/341, 251/342, 343, 344, 349, 351, 358; 220/714

(56) References Cited

U.S. PATENT DOCUMENTS 6,039,305 A * 3/2000 Hoskins et al. ............. 251/342
6,279,772 B1 * 8/2001 Bowman ..................... 220/703
6,557,721 B2 * 5/2003 Yang ........................... 220/713

* cited by examiner

Primary Examiner—Edward K. Look
Assistant Examiner—John K. Fristoe, Jr.
(74) Attorney, Agent, or Firm—Leong C. Lei (57) ABSTRACT

A hard and soft plastic integral nozzle structure includes a built-in supporting frame member which is made of hard plastic, and at least having a left and a right clipping rod. A soft nozzle is formed integrally by inrection to wrap the the left and right clipping rods with a soft plastic. A taper board and a peripheral groove are provided in the center of the nozzle. The elasticity of the two clipping rods of the supporting frame made of hard plastic material brings an excellent anti-leaking effect for the water outlet crevice(s) at the center of the nozzle, as well as a fully open status thereof.

3 Claims, 8 Drawing Sheets

INTEGRALLY FORMED NOZZLE STRUCTURE WITH SOFT AND HARD PLASTICS

BACKGROUND OF THE INVENTION (a) Field of the Invention

The present invention relates to An improvement of a nozzle structure, especialy to an integrally formed nozzle structure with soft and hard plastics, which comprises a soft type mouth piece made of soft plastic material. A flexible supporting frame made of hard plastic material is integrally provided inside of the mouth piece, so that when the user may hold the mouth piece in his/her mouth to drink water, he/she may have the soft feeling on the mouth piece and effectively stop the water flow with the press from the hard plastic supporting frame and its flexible clipping rods. Besides, an awal-shaped block and an periphal groove are provided on the water outlet such that when the water outlet may wholly open is pressed, so that when the water outlet can fully expanded when being pressed. Unlike those prior arts, the present may allow great amount of water to flow out of the container.

(b) Description of the Prior Arts

People usually need to replenish lost water due to sweat in taking outdoor exercises such as jogging, mountain climbing, or cycling. As an exerciser cannot easily obtain water as at home, he/she generally would prepare a special water pouch for carrying water or drink for the need supplementing water in exercise. Said water pouch may be carried on the back of the exerciser and would not hinder the exerciser from exercising.

As the special water pouch for outdoor exercises uses a conduit to draw water for the user's sucking, it has a nozzle structure on the water pouch. In soft nozzle structure as disclosed in the U.S. Pat. Nos. 5,601,207, 5,730,336, 5,791,510, 6,032,831, and 6,070,767, the outer appearance of the nozzle is similar to a nipple of a feeding bottle, which is made by injection of soft plastic material such as PU or silicone. The front end of the nozzle has a plat or cross shape water outlet crevice. The peripheral plastic board of the tiny outlet crevice normally has a natural elasticity so that when the side walls of the water outlet crevice are pressed, the peripheral plastic board would dose and stop the water flow.

When in use, the user holds the soft nozzle in the mouth and clenches by teeth and lips so as to press the water outlet crevice to be in open status. Operating along with suction by mouth, the user can drink the water in the pouch.

Figure 1:
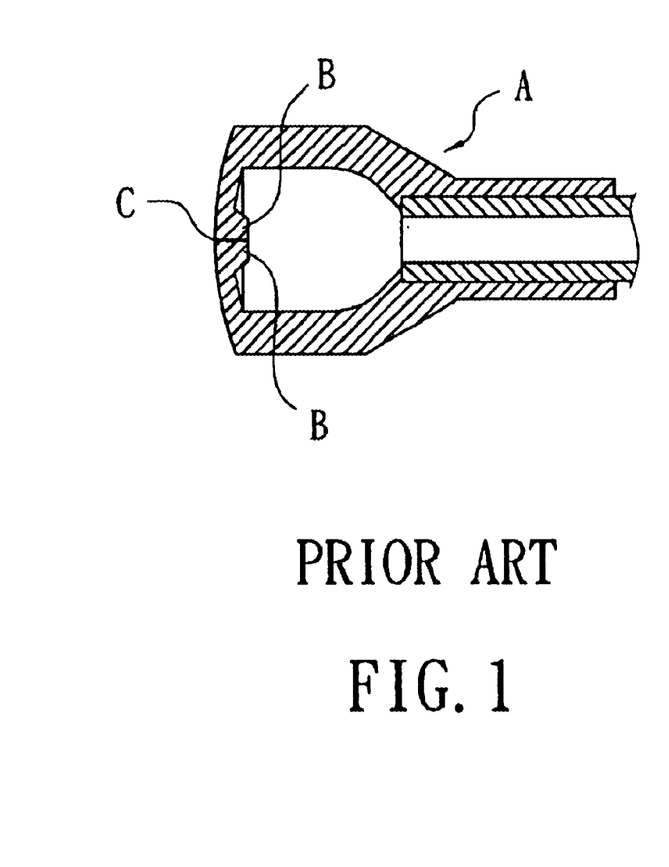
FIG. 1 is a sectional view of the nozzle according to U.S. Pat. No. 6,032,831.

Although soft nozzle of this type makes sucking easier without requiring much effort, water would leak from the nozzle simply due to accidental squeeze which makes the lips of the nozzle turn outside. FIG. 1 shows a sectional view of the nozzle A according to U.S. Pat. No. 6,032,831, wherein the heightened lips B are provided on two sides of the water outlet C, so as to obtain better function of stopping water by the high elasticity of the boards of the lips.

Figure 2:
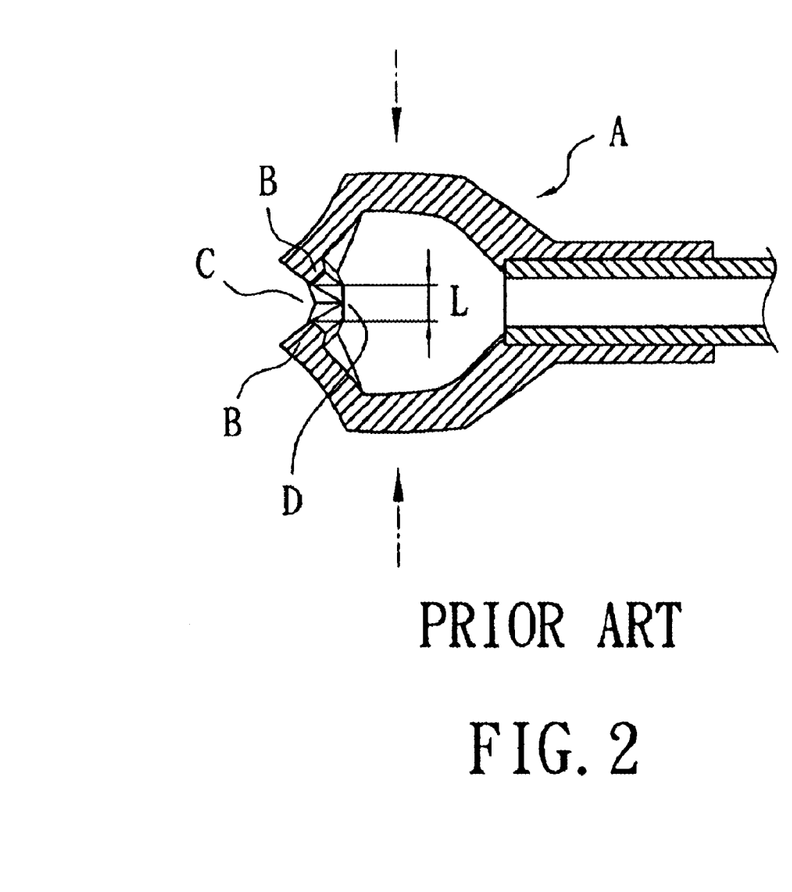
FIG. 2 is a side sectional view of the nozzle according to U.S. Pat. No. 6,032,831 showing the water outlet in open status when being pressed.
Figure 3:
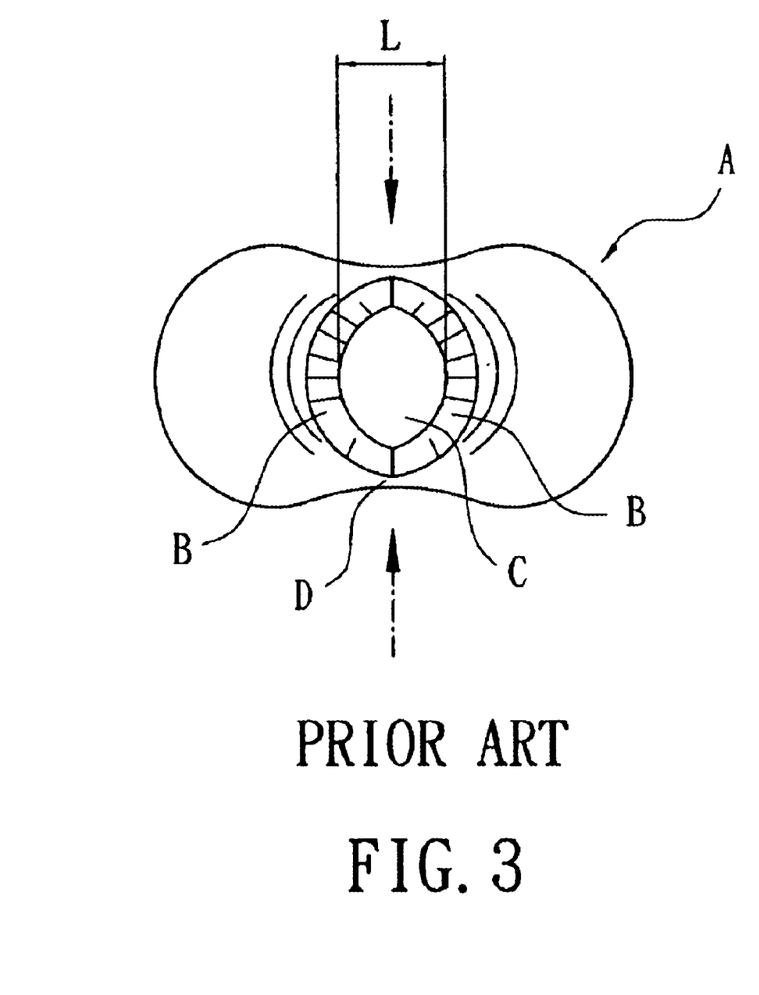
FIG. 3 is an enlarged front view of the nozzle according to U.S. Pat. No. 6,032,831 showing the water outlet in open status when being pressed.

When the nozzle A is pressed vertically (as shown in FIGS. 2 and 3), the water outlet C is pressed by the board to turn outside like lips. When turning to the angle L, the lips are connected with the board on the root portion D. Therefore, the angle of the opening is limited. As such, the water pouch of this type might not be applicable to juice with fruit flesh. In view of the above, the present discloses a soft type nozzle with greater opening.

BRIEF DESCRIPTION OF THE INVENTION

The primary object of the present invention is to provide a nozzle enabling the user to have a soft and comfortable feeling for holding it in the mouth, and in the meantime obtain a better anti-leaking effect of the soft nozzle. Besides, when being pressed on the water outlet, the opening of the nozzle can greatly expanded.

To obtain the above-mentioned object, the present invention comprises a soft covering plastic materials and a hard supporting frame. A combining frame is provided on the hard supporting frame. Clipping rods covered by soft plastic material made integrally to be a nozzle are extended symmetrically on the combining frame, so as to provide in the center of the nozzle the function of stopping water. Meanwhile, a taper board and a peripheral groove are provided in the center of the nozzle, wherein a water outlet crevice is provided in the center of the taper board so that when the water outlet is being pressed, it can fully open.

The foregoing object and summary provide only a brief introduction to the present invention. To completely appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DESCRIPTION OF THE PREFERRED EMBODIMENTS

For the purpose of promoting an understanding of the principles of the invention, reference will now be made to the embodiment illustrated in the drawings. Specific language will be used to describe the same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Figure 4:
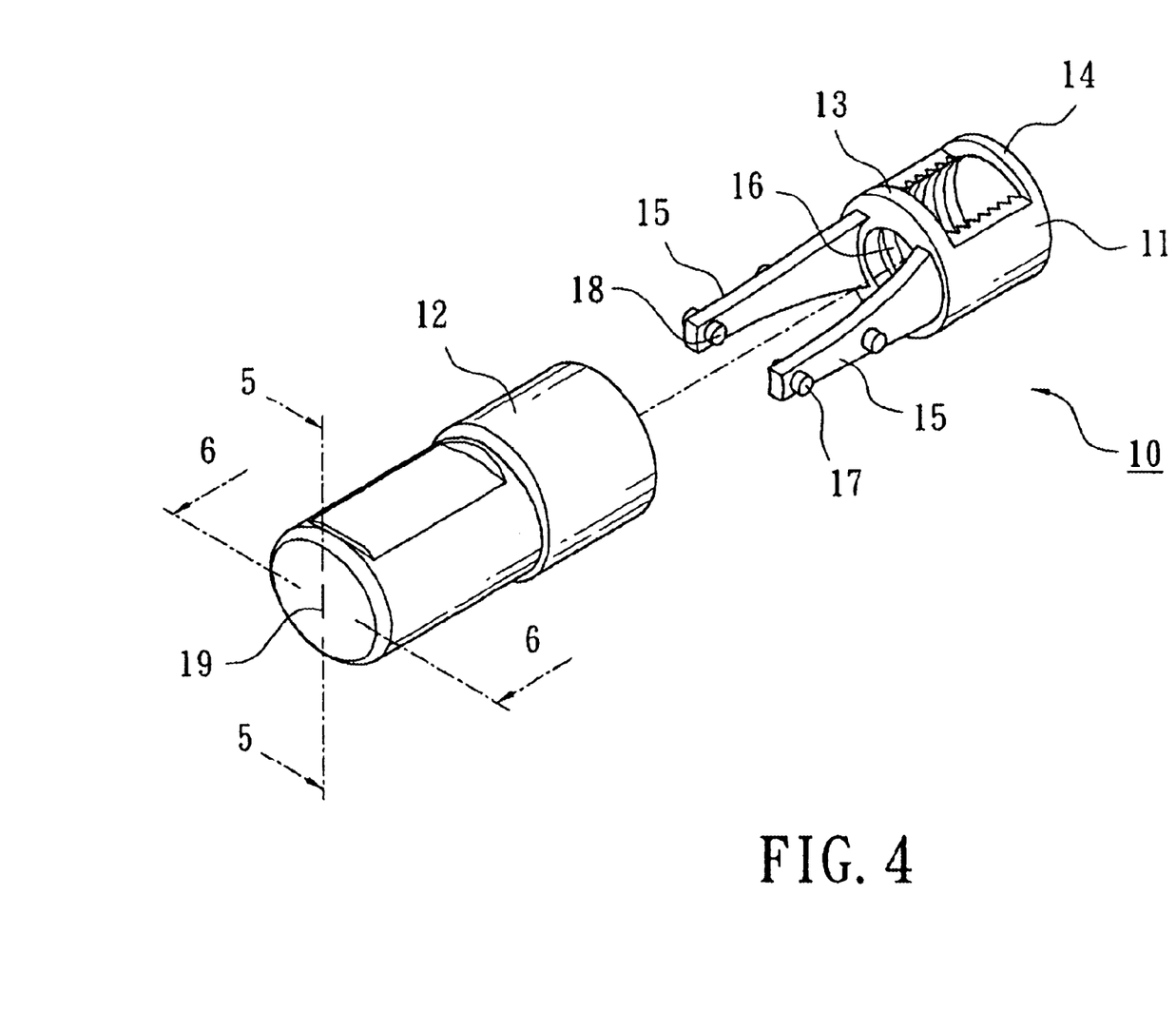
FIG. 4 is an exploded view of the invention.
Figure 5:
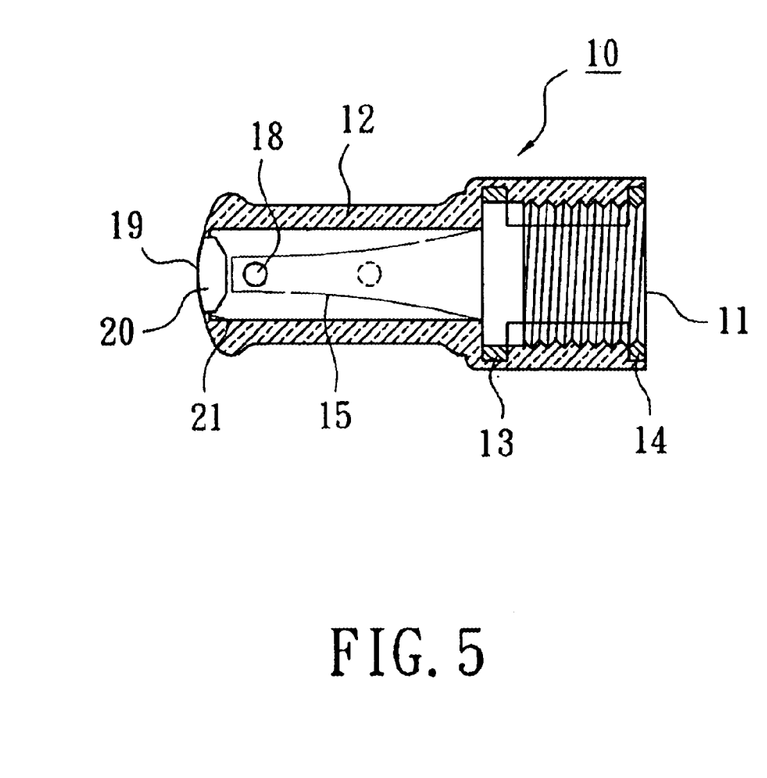
FIG. 5 is a longitudinal sectional view taken from FIG. 4.
Figure 6:
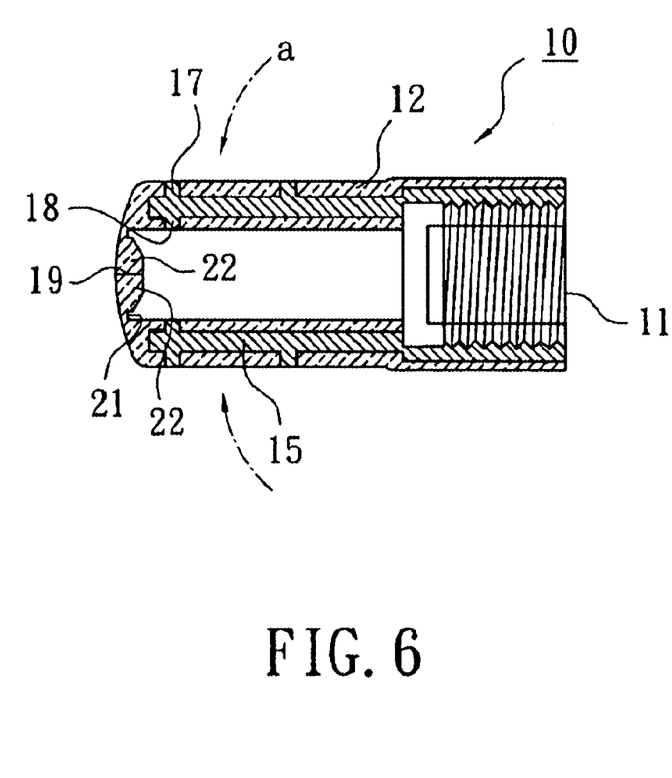
FIG. 6 is a cross-sectional view taken from FIG. 4.

As shown in FIGS. 46, the nozzle 10 according to the present invention comprises a hard plastic supporting frame 11 and a coating layer 12 of soft plastic material.

The supporting frame 11 made by the injection of hard plastic material comprises an integral frame 13, a threaded fastening ring 14 and two symmetrical clipping rods 15. An opening 13 is provided in the center of the supporting frame. The extended ends of the clipping rods 15 separate, and positioning pillars 17 are protruded from the external side of each clipping rod When the supporting frame 11 is placed in the mold, the positioning pillars 17 disposed on the outer side of the clipping rod acts as the positioning of the mold, and a propping mold in the mold can be retractable to insert into the opening 16 such that the board press against the inclined pressing section 18 of the clipping rods 15. The two clipping rods 15 are squeezed to open at a tiny angle. After the propping mold props and opens the two clipping rods 15, the soft plastic material is injected into the mold so that the exterior of the supporting frame 11 is completely wrapped by the soft plastic material which forms a soft coating layer 12 to comfort the user's mouth contact during sucking.

After removing the propping mold, the two hard plastic clipping rods 15 are pressed to separate and in an open status. As the propping mold is removed, it naturally forms a resuming status and retracts the clipping stress a (as shown in FIG. 6). The elasticity coefficient of the soft plastic coating layer 20 around the periphery of the supporting frame is smaller than the retracted clipping stress a on the clipping rods, so that an excellent clipping force forms and naturally provides an excellent anti-leaking effect when the water outlet crevice 19 at the center of the front section of the nozzle 10 is closed.

As the layer of soft plastic 12 is formed, it is combined with a thickened board 20 which is in taper shape. A peripheral groove 21 is provided on the roots of the (taper board 20, so that a water outlet crevice 19 is formed in the center of the board. When the water outlet crevice 19 of the nozzle 10 is being pressed, it can fully open.

Figure 7:
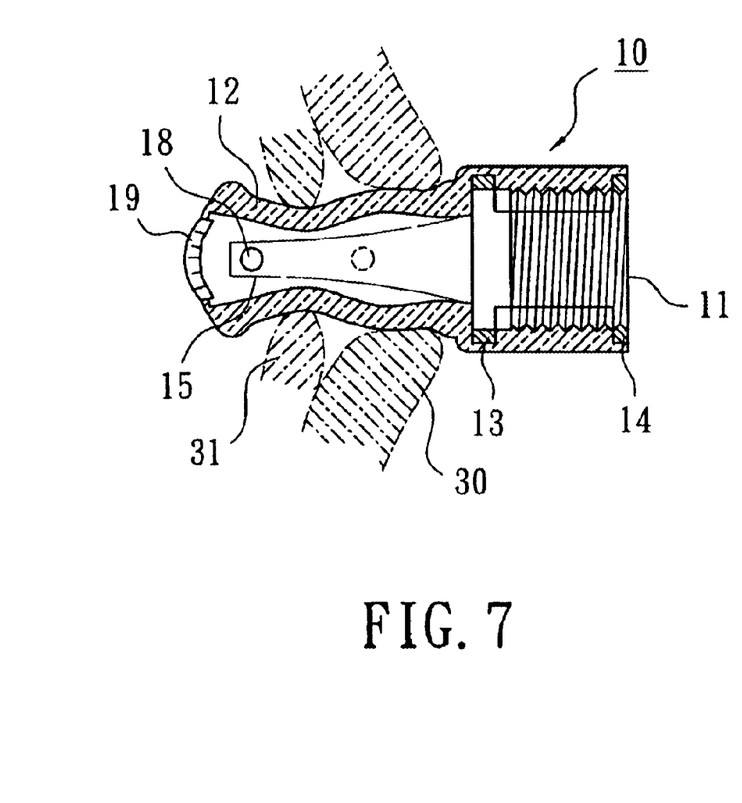
FIG. 7 is a persecutive view of the present invention showing the nozzle being pressed by the clench of teeth.
Figure 8:
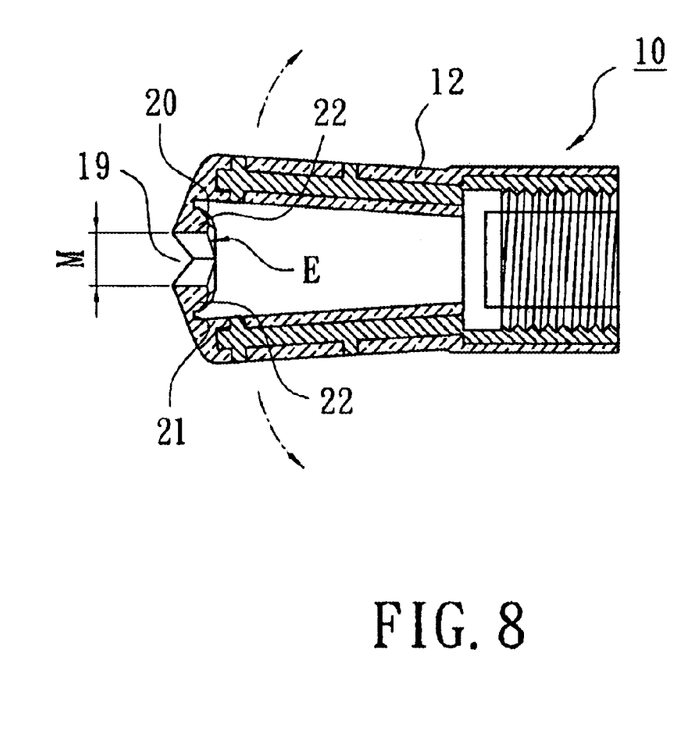
FIG. 8 is a cross-sectional view of the invention showing the water outlet in fully open status.

Now referring to FIGS. 7 and 8 for the soft type nozzle 10 according to the invention. When the nozzle 10 is hold by the lips 30 of the user, and subsequently clenched by the teeth 31, the soft layer 12 of the nozzle transforms (as indicated by arrow E), and the lips 22 separate to a distance M and to expand the water outlet crevice 19 (as shown in FIG. 9) to be in an open status for the fruit flesh in the juice to pass through the outlet.

Figure 9:
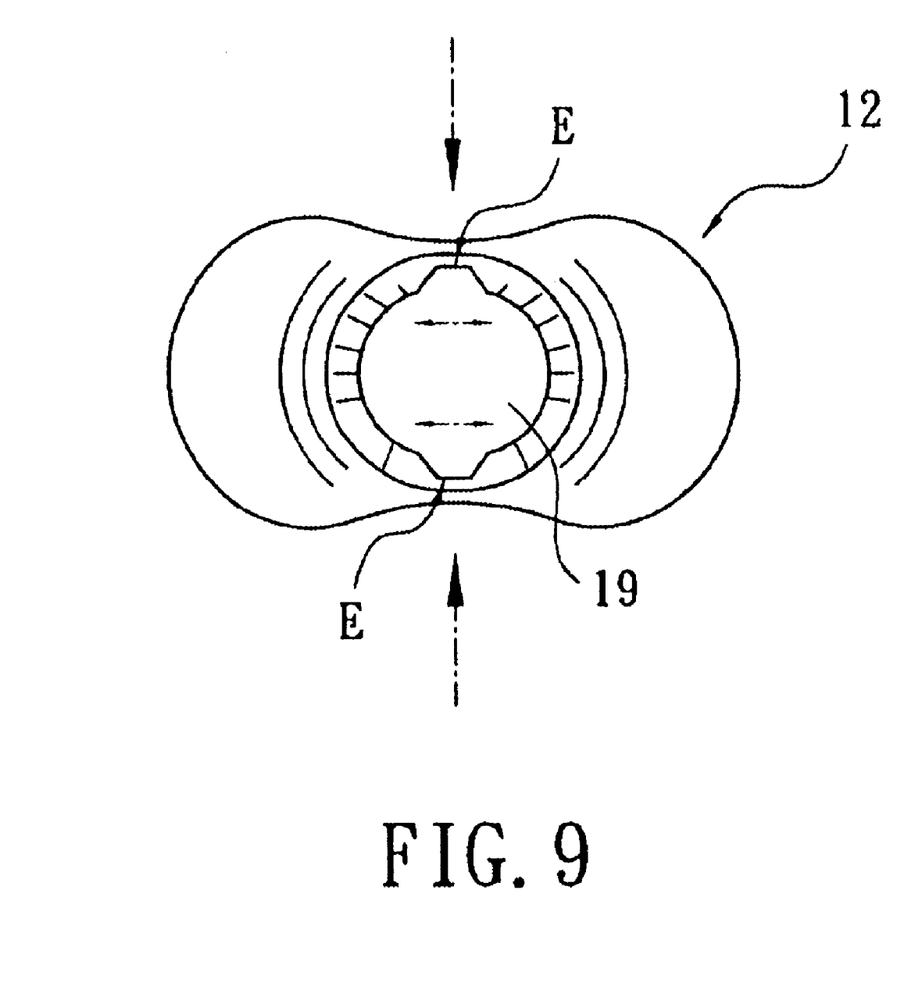
FIG. 9 is a front view of the invention showing the nozzle being pressed to let flow the water.

As shown in FIG. 9, when the user holds the nozzle 10 by mouth, the user can hold the soft coating layer 12 of the nozzle by an appropriate force exerted by the upper and lower jaws. The nozzle according to the present invention has a layer of soft plastic material on the upper and the lower sides of the nozzle 10, so that when the soft coating layer 12 is hold in the mouth, the user enjoys the comfort of sucking the water the same way as that from general soft nozzle. Comparing with the conventional nozzle shown in FIG. 3, as the present invention is provided on the root periphery of the taper board 20 a peripheral groove 21 with a thin board, when the lips 22 of the taper board 20 turn outside, the border (as indicated by arrow E) between the two lips 22 extends laterally due to the different elasticity and transformation of the boards. As such, the water outlet crevice 19 expands and allow the water/juice to flow out.

When the holding force is released, the left and right sides of the clipping rods will automatically dip to dose the water outlet crevice 19 in order to attain a definite anti-leaking effect which is much better than that for the traditional soft nozzle.

Figure 10:
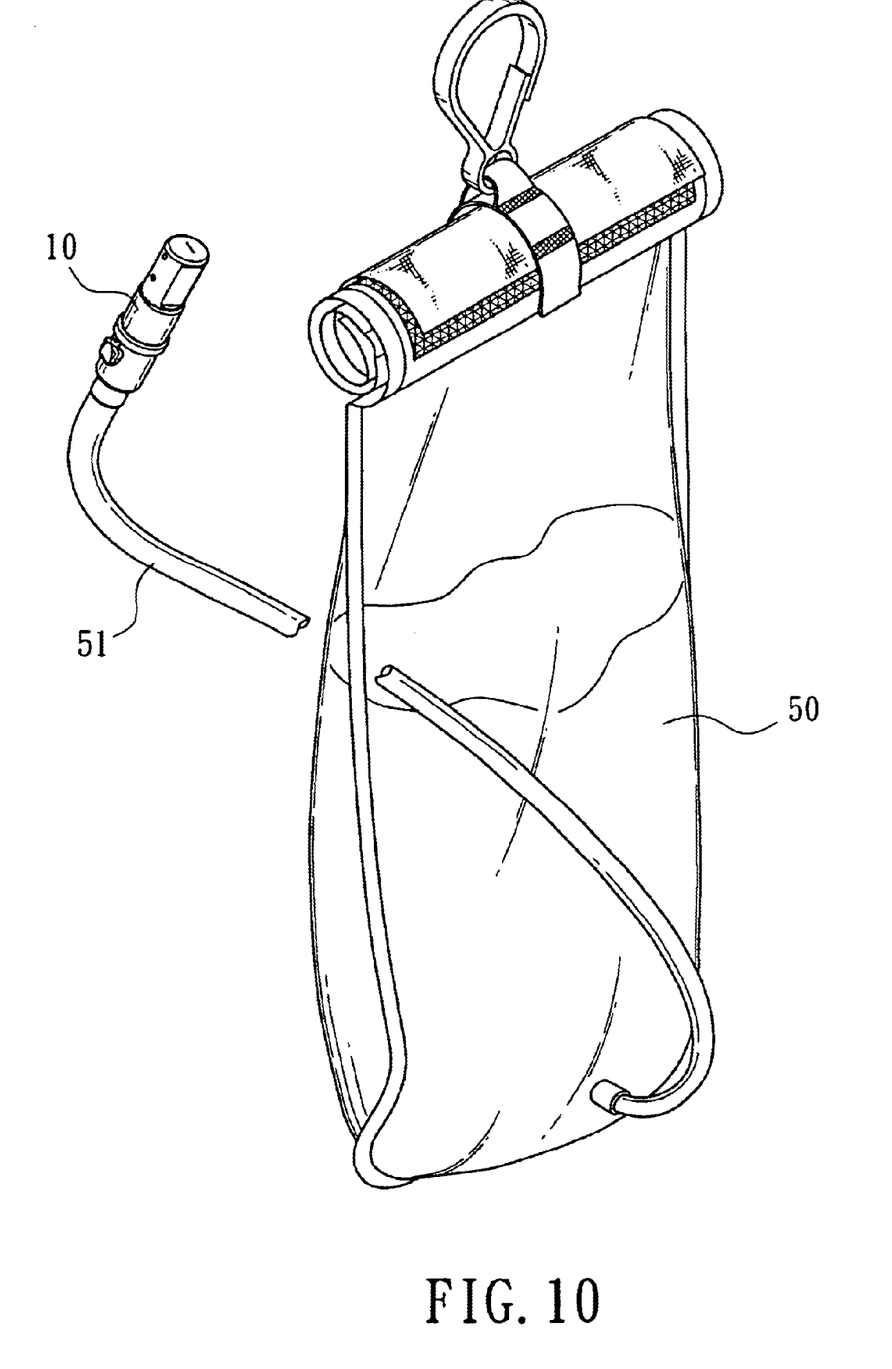
FIG. 10 is a general view of an embodiment according to the invention.

As shown in FIG. 10, the nozzle 10 according to the invention can be applicable to a water pouch 50 for biking. The user may carry the water pouch on his/her back and drink the water through the nozzle 10 by a conduit 51 connected to the water pouch.

Figure 11:
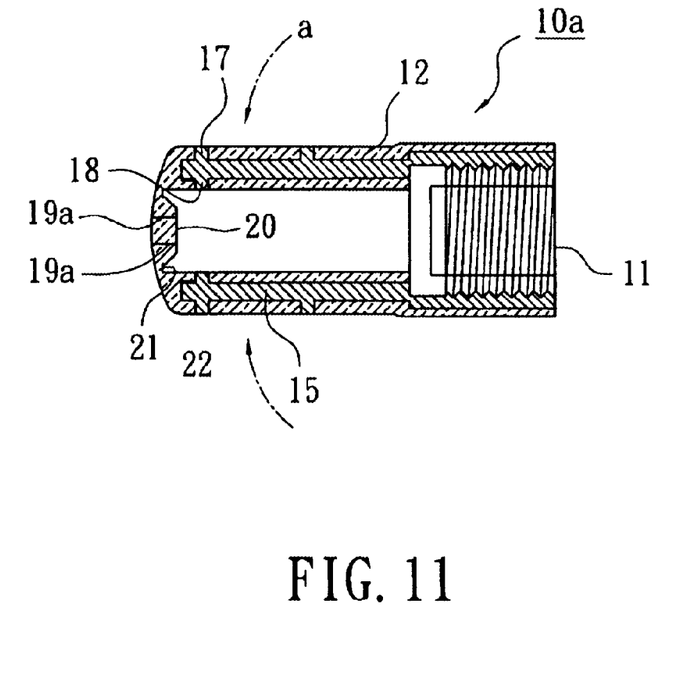
FIG. 11 is a cross-sectional view of the nozzle according to the invention.
Figure 12:
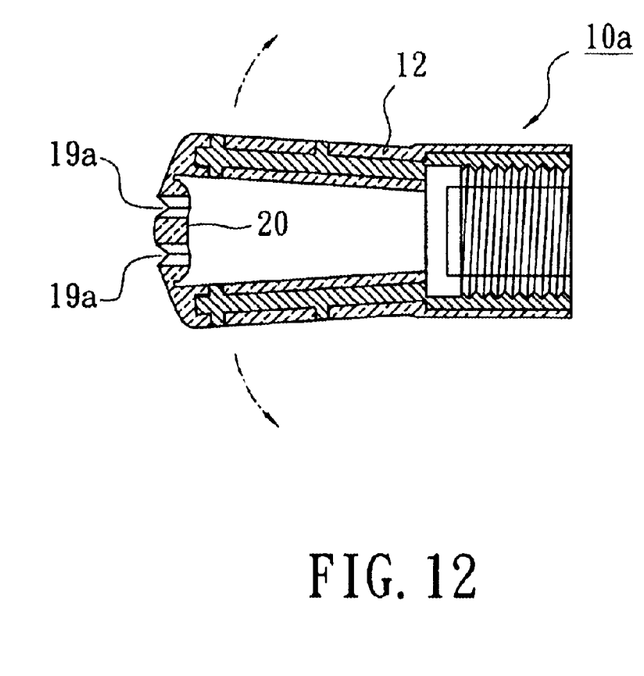
FIG. 12 is a cross-sectional view of the invention as shown in FIG. 11 showing the nozzle being pressed on the water outlet crevice.

As shown in FIGS. 11 and 12, the nozzle 10a according to the invention may be provided with separate water outlet crevices 19a in the front end thereof. The water outlet crevices 19a also comprise a taper board 20 and a peripheral groove 21. When the soft layer of plastic 12 is pressed vertically (referring to FIG. 7), the two water outlet crevices 19a expand (as shown in FIG. 12).

Concluded above, the invention refers to an improvement of a nozzle made integrally with soft and hard plastic materials. A hard supporting frame is hidden inside of a layer of soft plastic. By way of the elasticity of two clipping rods, the water/drink can flow out of the water pouch for the user's drinking and for stopping water flow after used. A taper board and a peripheral groove are provided on the water outlet crevice, so that when the board is being pressed, the water flow may be enhanced, which is especially applicable to juice with fruit flesh.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. An integrally formed nozzle structure with soft and hard plastic, comprising:

a supporting frame made by injection of hard plastic material, at least having a complete frame and two clipping rods, wherein a opening is provided in the center of the frame; and a coating layer made of soft plastic material, which is made by injection to wrap the supporting frame, and a water outlet crevice being disposed in the middle of the front end of the supporting fame, characterized in that:

a threaded fastening ring is provided in the end of the supporting frame, in order to hold the water outlet; a taper board and a peripheral groove are provided in the center of the nozzle; the elasticity of the two clipping rods of the supporting frame made of hard plastic material brings an anti-leaking effect for the water outlet crevice(s) at the center of the nozzle, as well as a fully open status thereof.

2. The integrally formed nozzle structure with soft and hard plastic according to claim 1, wherein the taper board is composed by the left and right lips on the two sides of the water outlet crevice, the border of the two lips is a thin board of the peripheral groove; when the nozzle is being pressed, said border of lips transform and extend laterally.

3. The integrally formed nozzle structure with soft and hard plastic according to claim 1, wherein the taper board may be provided with two water outlet crevices.

* * * * *